(12) United States Patent
Tang et al.

(10) Patent No.: US 6,809,504 B2
(45) Date of Patent: Oct. 26, 2004

(54) DUAL LOOP REGULATOR

(75) Inventors: Benjamim Tang, Hawthorne, CA (US); Ken Ostrom, Palos Verdes Estates, CA (US); Tim Ng, Monterey Park, CA (US); Clifford Duong, Fountain Valley, CA (US)

(73) Assignee: Primarion, Inc., Tempe, AZ (US)

( * ) Notice: Subject to any disclaimer, the term of this patent is extended or adjusted under 35 U.S.C. 154(b) by 0 days.

(21) Appl. No.: 10/104,199

(22) Filed: Mar. 21, 2002

(65) Prior Publication Data

US 2002/0135339 A1 Sep. 26, 2002

Related U.S. Application Data

(63) Continuation-in-part of application No. 09/945,187, filed on Aug. 31, 2001.
(60) Provisional application No. 60/277,496, filed on Mar. 21, 2001.

(51) Int. Cl.[7] ............................. G05F 1/56; H02M 3/335
(52) U.S. Cl. ......................... 323/274; 323/284; 363/16
(58) Field of Search ............................... 323/274, 273, 323/272, 268, 282, 284, 283, 286; 363/21.04, 21.07, 21.09, 16, 17, 95, 97, 49

(56) References Cited

U.S. PATENT DOCUMENTS

| | | | |
|---|---|---|---|
| 4,847,720 A | * 7/1989 | Dezonno | 361/18 |
| 5,034,873 A | * 7/1991 | Feldtkeller | 363/97 |
| 5,623,596 A | * 4/1997 | Townsley et al. | 395/182.12 |
| 5,629,608 A | * 5/1997 | Budelman | 323/268 |
| 6,028,417 A | 2/2000 | Ang et al. | |
| 6,064,187 A | 5/2000 | Redl et al. | |

FOREIGN PATENT DOCUMENTS

| | | |
|---|---|---|
| EP | 0 779 568 A2 | 6/1997 |
| WO | WO 00/28648 | 5/2000 |

OTHER PUBLICATIONS

Lekahena, Clifford, "Notification of Transmittal of the International Search Report," Sep. 3, 2002.
Intersil, "Transient Voltage Regulator DeCAPitator," Feb. 1998, Data Sheet, pp 2–441 through 2–449.
Intersil, "Evaluation Tool Demonstrates DeCAPitator Performance (HIP6200EVAL1)," Aug. 1998, Application Note, pp 4–58 through 4–66.

* cited by examiner

*Primary Examiner*—Rajnikant B Patel
(74) *Attorney, Agent, or Firm*—Theodore E. Galanth

(57) ABSTRACT

A dual loop regulator is configured for improved regulation of a supply voltage for a dynamic load based on the magnitude of changes in the load voltage. An exemplary dual loop regulator comprises a primary voltage regulator configured within a linear loop and a secondary voltage regulator configured within a wideband, non-linear loop. The primary voltage regulator is configured for providing a well-controlled, regulated output voltage to the dynamic load, and for addressing small changes in the output voltage. The secondary voltage regulator is configured for sensing undervoltage and overvoltage conditions at the dynamic load, and for addressing changes greater than a predetermined threshold voltage. To facilitate loop stability, secondary voltage regulator can be configured within the wideband, non-linear loop to have a small gain for small changes, a larger gain for large changes, and/or a substantially finite storage capability such that any large signal oscillations will not be sustained.

30 Claims, 6 Drawing Sheets

DUAL LOOP REGULATOR

CROSS-REFERENCE TO RELATED APPLICATIONS

This application claims priority from prior pending U.S. Provisional Application Ser. No. 60/277,496, entitled "Dual Loop Regulator Using A Nonlinear Wide-Band Loop," filed Mar. 21, 2001; this application also claims priority from pending U.S. application Ser. No. 09/945,187, entitled, "Apparatus and System for Providing Transient Suppression Power Regulation", filed on Aug. 31, 2001, and hereby incorporated herein by reference.

FIELD OF THE INVENTION

The present invention generally relates to microelectronic devices. More particularly, the present invention relates to a circuit for regulating a supply voltage for a load device, such as internal circuitry for microprocessors and the like.

BACKGROUND OF THE INVENTION

As modem digital integrated circuits are being continuously enhanced to deliver increased performance, such digital integrated circuits are becoming increasingly sensitive to degradation in waveform quality. In particular, as clock rates and circuit density increase, a significant amount of transient current must be supplied to charge and discharge the internal capacitive loads within the digital integrated circuits. These severe current transients, if not adequately filtered or regulated, can result in supply and ground "bounce" which can introduce bit errors in the digital logic through degraded noise margin and supply induced timing violations.

Supply and ground bounce can be somewhat mitigated through the use of voltage regulation and internal and external capacitive bypassing techniques, as well as the use of low inductance and low resistance pins within the digital integrated circuit. However, the amount of voltage regulation and capacitive bypassing that can be provided is limited by the impact on the digital integrated circuit's cost and complexity, as well as performance limitations of the passive components and parasitics associated with the placement of such components.

For example, with reference to FIG. 1, a prior art methodology for voltage regulating and capacitive bypassing of the internal supply and ground on an integrated circuit is illustrated. A digital integrated circuit 100 comprises a supply voltage $V_{SUPPLY}$, a voltage regulator 102, a bypass capacitor $C_{BYPASS}$, and internal circuitry represented as a dynamic load 104. Dynamic load 104 comprises the device that requires power to be supplied, such as a microprocessor. Dynamic load 104 includes both high frequency content in the form of current pulses as the internal nodes switch, and time varying characteristics as the internal circuitry activity level varies depending on the function the internal circuitry is performing at any given time.

Voltage regulator 102 can comprise a switching or a non-switching regulator, and is configured to operate from supply voltage $V_{SUPPLY}$, such as a 12 volt supply. Voltage regulator 102 is configured to generate a well-controlled, regulated supply voltage to dynamic load 104, such as a 1.8 volts. Voltage regulator 102 is coupled to dynamic load 104 through a parasitic inductance $L_{SUPPLY}$ and a parasitic inductance $L_{GROUND}$, which can cause changes in load current resulting in changes in the voltage at dynamic load 104.

Voltage regulator 102 can be effective in tracking the slow changes in dynamic load 104, i.e., within the internal circuitry. However, due to requirements for a relatively low bandwidth, voltage regulator 102 cannot track fast changes within the internal circuitry. In particular, the ability of voltage regulator 102 to respond to fast transient events is set by the bandwidth of voltage regulator 102. While a wide bandwidth loop is desirable, the bandwidth of the voltage regulator loop must be limited such that the loop stability criteria can be met. This requirement results in a relatively slow response to transients, and little, if any, suppression of the critical high frequency components.

For example, in a closed-loop system, the delay due to parasitics and devices, such as amplifiers and buffers, can be a source of instability. If the loop response is delayed by over a half period, the polarity is inverted, so the loop gain must be below unity or the loop will be unstable. Therefore, linear loops are often stabilized by reducing the loop bandwidth such that the effect of component delays are minimized. This reduced bandwidth limits the ability of linear regulator loops to compensate for fast changes in dynamic load current.

Bypass capacitor $C_{BYPASS}$ is coupled across dynamic load 104. Bypass capacitor $C_{BYPASS}$ can be effective in filtering the dynamic switching currents, such as that caused by a change in current through parasitic inductances $L_{SUPPLY}$ and $L_{GROUND}$. Bypass capacitor $C_{BYPASS}$ is configured to sustain the load voltage required by dynamic load 104, by supplying current from bypass capacitor $C_{BYPASS}$, to provide additional time for voltage regulator 102 to accommodate the changes at dynamic load 104. However, in response to changes in dynamic load 104, bypass capacitor $C_{BYPASS}$ can only sustain the required load voltage for a brief period of time. Thus, a voltage "droop", i.e., an undervoltage condition, or a "spike", i.e., an overvoltage condition, in the load voltage can be realized until voltage regulator 104 can respond. If the voltage droop or spike exceeds the tolerable range in power supply, the internal circuitry operates with degraded noise margin and timing performance, increasing the possibility of bit errors and timing violations in the digital circuitry. This voltage drooping or spiking problem exists when load current in dynamic load 104 is increased or decreased, respectively.

One approach for addressing the undervoltage and overvoltage conditions includes the use of a secondary regulator for improved transient response. For example, with reference to FIG. 2, a power supply circuit 200 with secondary voltage regulation is illustrated, as is disclosed more fully in U.S. application Ser. No. 09/945,187, entitled, "Apparatus and System for Providing Transient Suppression Power Regulation", filed on Aug. 31, 2001, and having common inventors and a common assignee as the present application. Power supply circuit 200 includes an unregulated DC voltage supply 202, a primary voltage regulator 204, a secondary voltage regulator 206, a sense circuit 210 and a load 208.

Unregulated DC voltage supply 202 provides a supply voltage $V_{IN}$ to primary voltage regulator 204, which can provide a regulated output voltage $V_{OUT}$ to load 208. Sense circuit 210 is configured to sense changes in current and to enable secondary voltage regulator 206 to suitably source current to or sink current from load 208. Secondary voltage regulator 206 is configured to provide a fixed amount of current for a fixed amount of time, independent of the total magnitude of the change in load current. Thus, while secondary voltage regulator 206 and sense circuit 210 are configured for fast detection of an undervoltage or overvoltage condition, regulator 206 and sense circuit 210 may not be optimum for closed-loop operation.

SUMMARY OF THE INVENTION

In accordance with various aspects of the present invention, a dual loop regulator is configured for improved regulation of a supply voltage for a dynamic load based on the magnitude of changes in the load voltage. An exemplary dual loop regulator comprises a primary voltage regulator configured within a slower response, linear loop and a secondary voltage regulator configured within a faster response, non-linear wideband loop. The primary voltage regulator is configured for providing a well-controlled, regulated load voltage to the dynamic load by addressing small changes in the load voltage. The secondary voltage regulator is configured for determining undervoltage and/or overvoltage conditions at the dynamic load, and for addressing changes in the load voltage greater than predetermined threshold values. To facilitate loop stability, secondary voltage regulator can be configured within the wideband, non-linear loop to have a small gain for small changes, a larger gain for large changes, and/or a substantially finite charge storage capability such that any large signal oscillations will not be sustained.

In accordance with an exemplary embodiment, the secondary voltage regulator comprises at least one comparator device configured for detecting changes in the load voltage, e.g., for determining undervoltage or overvoltage conditions, and a least one current source configured for sourcing current to or sinking current from the dynamic load. At least one comparator device can be configured for comparing changes in the output voltage to a predetermined undervoltage threshold or an overvoltage threshold, and for enabling the at least one current source to suitably source or inject current to the dynamic load for undervoltage conditions or to sink current from the dynamic load for overvoltage conditions. As a result of the high gain for changes greater than the threshold levels, the wideband, non-linear loop can quickly respond to fast changes in the dynamic load.

In accordance with various other exemplary embodiments, the secondary voltage regulator can include at least two comparator devices coupled to two current sources, with one comparator device and one current source configured for determining undervoltage conditions and for sourcing current to the dynamic load, and another comparator device and current source configured for determining overvoltage conditions and for sinking current from the dynamic load. In addition, the secondary voltage regulator can be configured with a plurality of secondary voltage regulator circuits, with each secondary voltage regulator circuits being configured for determining undervoltage and/or overvoltage conditions and for sourcing current to and/or sinking current from the dynamic load.

BRIEF DESCRIPTION OF DRAWING FIGURES

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS

Figure 1:
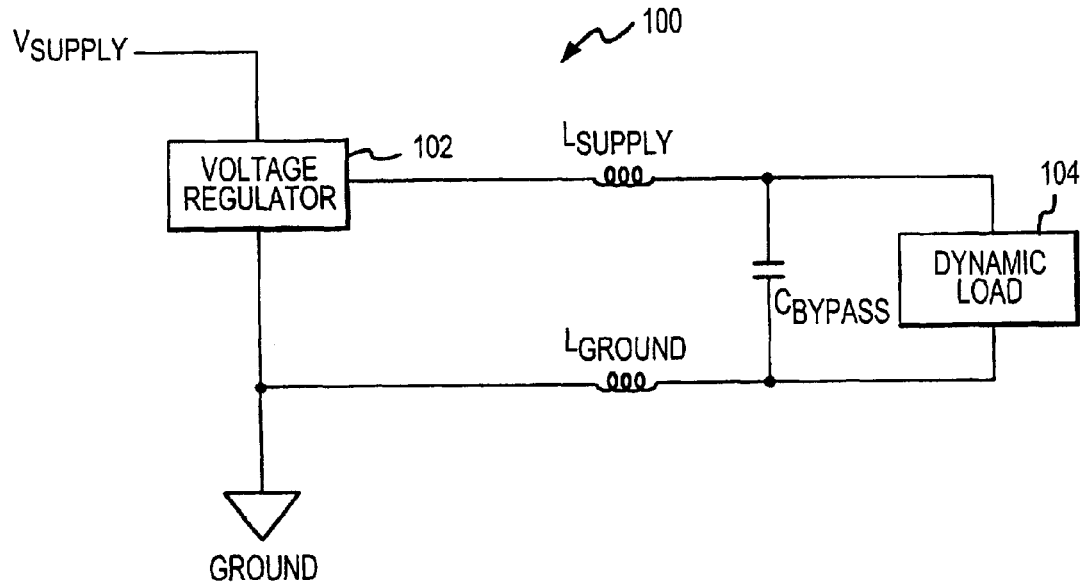
FIG. 1 illustrates a block diagram of a prior art voltage regulator circuit.

The present invention may be described herein in terms of various functional components and various processing steps. It should be appreciated that such functional components may be realized by any number of hardware or structural components configured to perform the specified functions. For example, the present invention may employ various integrated components comprised of various electrical devices, e.g., resistors, transistors, capacitors, diodes and the like, whose values may be suitably configured for various intended purposes. In addition, the present invention may be practiced in any integrated circuit application where high-frequency, high speed and/or lower-voltage requirements are desired. However for purposes of illustration only, exemplary embodiments of a dual loop regulator will be described herein. Further, it should be noted that while various components may be suitably coupled or connected to other components within exemplary circuits, such connections and couplings can be realized by direct connection between components, or by connection through other components and devices located thereinbetween.

As discussed above, prior art voltage regulator circuits have limitations in responding to fast transient events, or may not be optimum for closed-loop operation. However, in accordance with various aspects of the present invention, a dual loop regulator is configured for improved regulation of a supply voltage for a dynamic load based on the magnitude of changes in the load voltage.

An exemplary dual loop regulator comprises a primary voltage regulator configured within a slower response, linear loop and a secondary voltage regulator configured within a faster response, non-linear wideband loop. The primary voltage regulator is configured for providing a well-controlled, regulated load voltage to the dynamic load by addressing small changes in the load voltage. The secondary voltage regulator is configured for determining undervoltage and/or overvoltage conditions at the dynamic load, and for addressing changes in the load voltage greater than predetermined threshold values. To facilitate loop stability, secondary voltage regulator can be configured within the wideband, non-linear loop to have a small gain for small changes, a larger gain for large changes, and/or a substantially finite charge storage capability such that any large signal oscillations will not be sustained.

In accordance with an exemplary embodiment, the secondary voltage regulator comprises at least one comparator device configured for detecting changes in the load voltage, e.g., for determining undervoltage or overvoltage conditions, and a least one current source configured for sourcing current to or sinking current from the dynamic load. At least one comparator device can be configured for comparing changes in the output voltage to a predetermined undervoltage threshold or an overvoltage threshold, and for enabling the at least one current source to suitably source or inject current to the dynamic load for undervoltage conditions or to sink current from the dynamic load for overvoltage conditions. As a result of the high gain for changes greater than the threshold levels, the wideband, non-linear loop can quickly respond to fast changes in the dynamic load.

Figure 3:
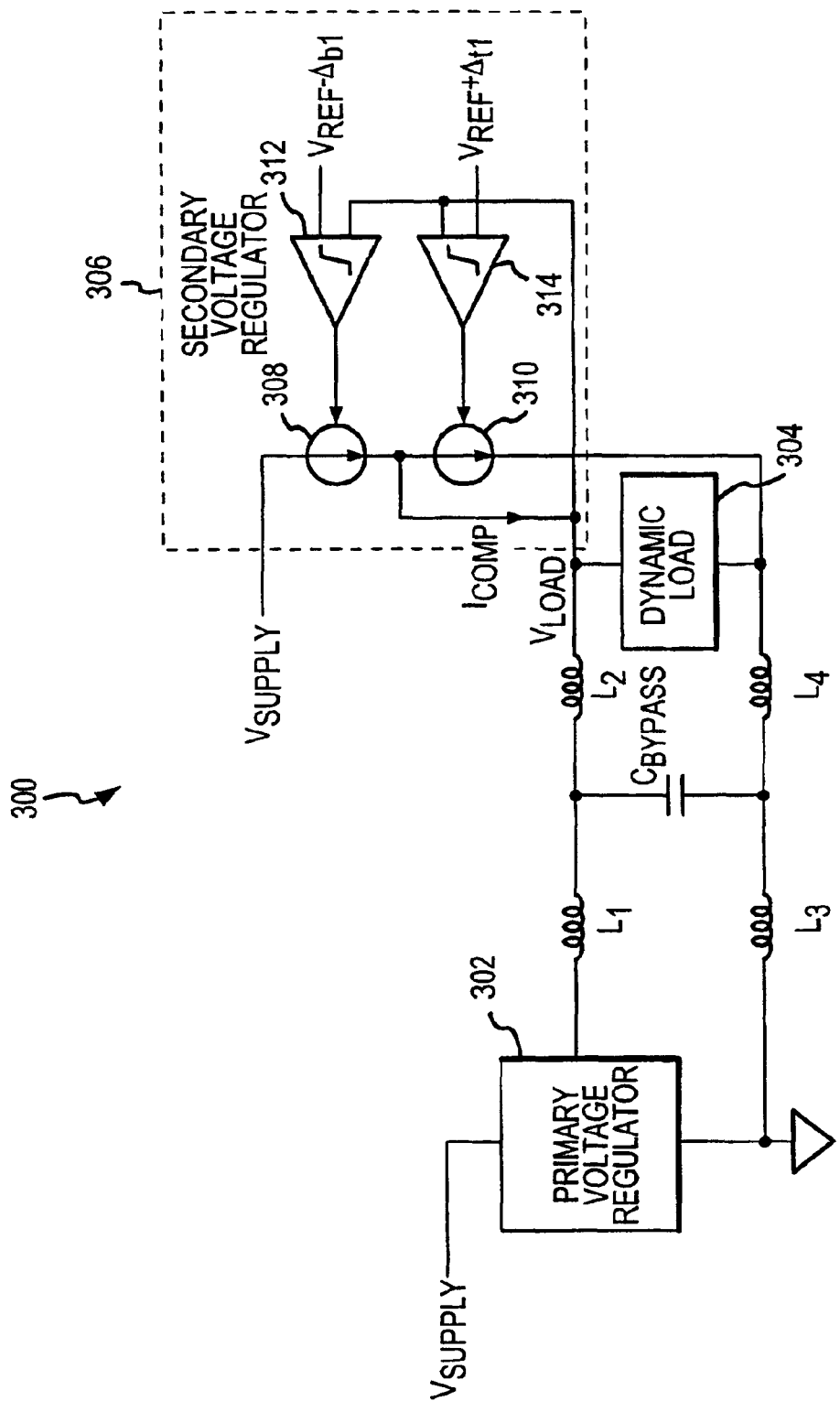
FIG. 3 illustrates a block diagram of an exemplary dual loop regulator circuit in accordance with an exemplary embodiment of the present invention.

For example, with reference to FIG. 3, an exemplary dual loop regulator circuit 300 is illustrated. Dual loop regulator circuit 300 comprises a primary voltage regulator 302, a bypass capacitor $C_{BYPASS}$, a dynamic load 304, and a secondary voltage regulator 306. In addition, other elements and devices can be included for providing increased stability, as described below.

Primary voltage regulator 302 is configured within in a linear loop to facilitating a well-controlled, regulated output voltage $V_{LOAD}$ to dynamic load 304, such as 1.8 volts. Primary voltage regulator 302 can comprise a switching regulator for high efficiency, or a non-switching regulator with less efficiency, for providing output voltage $V_{LOAD}$ to dynamic load 304. Primary voltage regulator 302 is configured to operate from supply voltage $V_{SUPPLY}$, such as a 12 volt supply, and is coupled to dynamic load 304 through parasitic inductances $L_1$, $L_2$, $L_3$ and $L_4$. Parasitic inductances $L_1$ and $L_3$ tend to comprise larger inductances, while parasitic inductances $L_2$ and $L_4$ tend to comprise smaller inductances.

Through operation within the linear loop, primary voltage regulator 302 is configured to provide output voltage $V_{LOAD}$ and corresponding output current such that output voltage $V_{LOAD}$ at dynamic load 304 approximates a reference voltage $V_{REF}$, such as 1.8 volts. The difference between output voltage $V_{LOAD}$ and reference voltage $V_{REF}$ comprises an error voltage $V_{ERROR}$, i.e., $V_{LOAD}-V_{REF}=V_{ERROR}$. Primary voltage regulator 302 is configured to regulate error voltage $V_{ERROR}$ to approximately zero volts in a linear manner, i.e., the response of primary voltage regulator 302 is proportional to error voltage $V_{ERROR}$. In addition, the bandwidth of primary voltage regulator 302 is limited in order to maintain stability of the linear loop in the presence of the parasitic inductances $L_1$, $L_2$, $L_3$ and $L_4$. Accordingly, primary voltage regulator 302 is configured within the linear loop for normal regulation, i.e., for addressing small changes in the output voltage, such as a smaller error voltage $V_{ERROR}$ that is less than predetermined undervoltage and/or overvoltage threshold levels.

Bypass capacitor $C_{BYPASS}$ is coupled across dynamic load 304. Bypass capacitor $C_{BYPASS}$ can be effective in filtering the dynamic switching currents, such as that caused by parasitic inductances $L_1$, $L_2$, $L_3$ and $L_4$. Bypass capacitor $C_{BYPASS}$ is configured to sustain output voltage $V_{LOAD}$ required by dynamic load 104, by supplying additional current from bypass capacitor $C_{BYPASS}$, to provide some additional time for primary voltage regulator 302 to accommodate the changes at dynamic load 304 during normal regulation.

Dynamic load 304 comprises the device or circuit that requires power to be supplied, such as a microprocessor-based device, or any integrated circuit device. Dynamic load 304 is configured for receiving a regulated supply voltage, i.e., output voltage $V_{LOAD}$, as regulated and provided from primary voltage regulator 302 and secondary voltage regulator 306. Dynamic load 304 comprises internal circuitry, with an activity level that varies depending on the function the internal circuitry is performing at any given time, resulting in increases and decreases in load current being demanded.

Secondary voltage regulator 306 is configured within a wideband, non-linear loop for determining undervoltage and/or overvoltage conditions at dynamic load 304, i.e., changes in output voltage $V_{LOAD}$ such that error voltage $V_{ERROR}$ is greater than a predetermined undervoltage or overvoltage threshold value. Secondary voltage regulator 306 is configured with a non-linear response, i.e., the response is not proportional to error voltage $V_{ERROR}$. However, secondary voltage regulator 306 can utilize magnitude control as discussed below. It is preferable that secondary voltage regulator 306 comprise a non-linear response to avoid simultaneously controlling output voltage $V_{LOAD}$ in a manner proportional to error voltage $V_{ERROR}$ as is controlled by primary voltage regulator 302.

While an exemplary secondary voltage regulator can be configured with a single comparator device and a single current source for determining undervoltage or overvoltage conditions, and for sourcing current to or sinking current from dynamic load 304, in accordance with the present embodiment, secondary voltage regulator 306 suitably comprises at least two comparator devices, e.g., comparator devices 312 and 314, and at least two current sources, e.g., current sources 308 and 310. Although high speed devices may be preferable, comparator devices 312 and 314 can comprise any comparator configuration for comparing two voltages. At least one comparator device, e.g., comparator device 312, is configured for detecting undervoltage conditions, i.e., load voltage $V_{LOAD}$ is less than the difference between reference voltage $V_{REF}$ and an undervoltage limit $\Delta_{b1}$, and at least one comparator device, e.g., comparator device 314, is configured for detecting overvoltage conditions, i.e., load voltage $V_{LOAD}$ is greater than the sum of reference voltage $V_{REF}$ and an overvoltage limit $\Delta_{t1}$. For example, comparator 312 has a positive input terminal coupled to an undervoltage condition signal, $V_{REF}-\Delta_{b1}$, and a negative input terminal coupled to dynamic load 304 in a voltage feedback arrangement to measure or sense load voltage $V_{LOAD}$, while comparator 314 has a positive input terminal coupled to an overvoltage condition signal, $V_{REF}+\Delta_{t1}$, and a negative input terminal coupled to dynamic load 304 in a voltage feedback arrangement to measure or sense load voltage $V_{LOAD}$. An output of comparator 312 for indicating an undervoltage condition is coupled to current source 308, while an output of comparator 314 for indicating an overvoltage condition is coupled to current source 310.

Reference voltage $V_{REF}$ can be suitably generated in various manners. For example, reference voltage $V_{REF}$ can be suitably selected to a fixed voltage level, such as approximately 1.8 volts or some other voltage level. In addition, reference voltage $V_{REF}$ can be provided as a readily configurable voltage derived from another voltage or current references. For example, reference voltage $V_{REF}$ can comprise a filtered or representative voltage based on the average load current or average load voltage $V_{LOAD}$, over some fixed or variable period of time.

Undervoltage limit $\Delta_{b1}$, and overvoltage limit $\Delta_{t1}$ can suitably be configured at various predetermined levels, e.g., between approximately 1 mV and hundreds of millivolts, depending on the desired operation of secondary voltage regulator 306. In addition, undervoltage limit $\Delta_{b1}$ is generally configured to prevent low voltage failures, such as logic failures, while overvoltage limit $\Delta_{t1}$ is generally configured to reduce power dissipation that can stress integrated circuitry within dynamic load 304. Thus, while undervoltage limit $\Delta_{b1}$ and overvoltage limit $\Delta_{t1}$ can be configured at the same levels, undervoltage limit $\Delta_{b1}$ and overvoltage limit $\Delta_{t1}$ do not need to be symmetrical, e.g., undervoltage limit $\Delta_{b1}$ can be configured at an approximately 30 mV level, while overvoltage limit $\Delta_{t1}$ can be configured at an approximately 100 mV level. Further, the levels of undervoltage limit $\Delta_{b1}$ and overvoltage limit $\Delta_{t1}$ can be suitably varied for modifying the gain of secondary voltage regulator 306. Accordingly, any of various levels can be implemented for undervoltage limit $\Delta_{b1}$ and overvoltage limit $\Delta_{t1}$ to provide a desired operation.

Current sources 308 and 310 are configured, respectively, for sourcing current to and sinking current from dynamic load 304 when an undervoltage or overvoltage condition exists. For example, current source 308 is coupled to the output of comparator 312 for receiving an undervoltage condition signal, while current source 310 is coupled to the output of comparator 314 for receiving an overvoltage condition signal. Current source 308 can be supplied current by supply voltage $V_{SUPPLY}$, while current source 310 can be coupled to ground. Current sources 308 and 310 are coupled to dynamic load 304 through various manners, such as through connection from a die pad, or any other connection mechanism or methodology, to allow a current $I_{COMP}$ to flow to or from dynamic load 304 during the sourcing and sinking of current.

Figure 5:
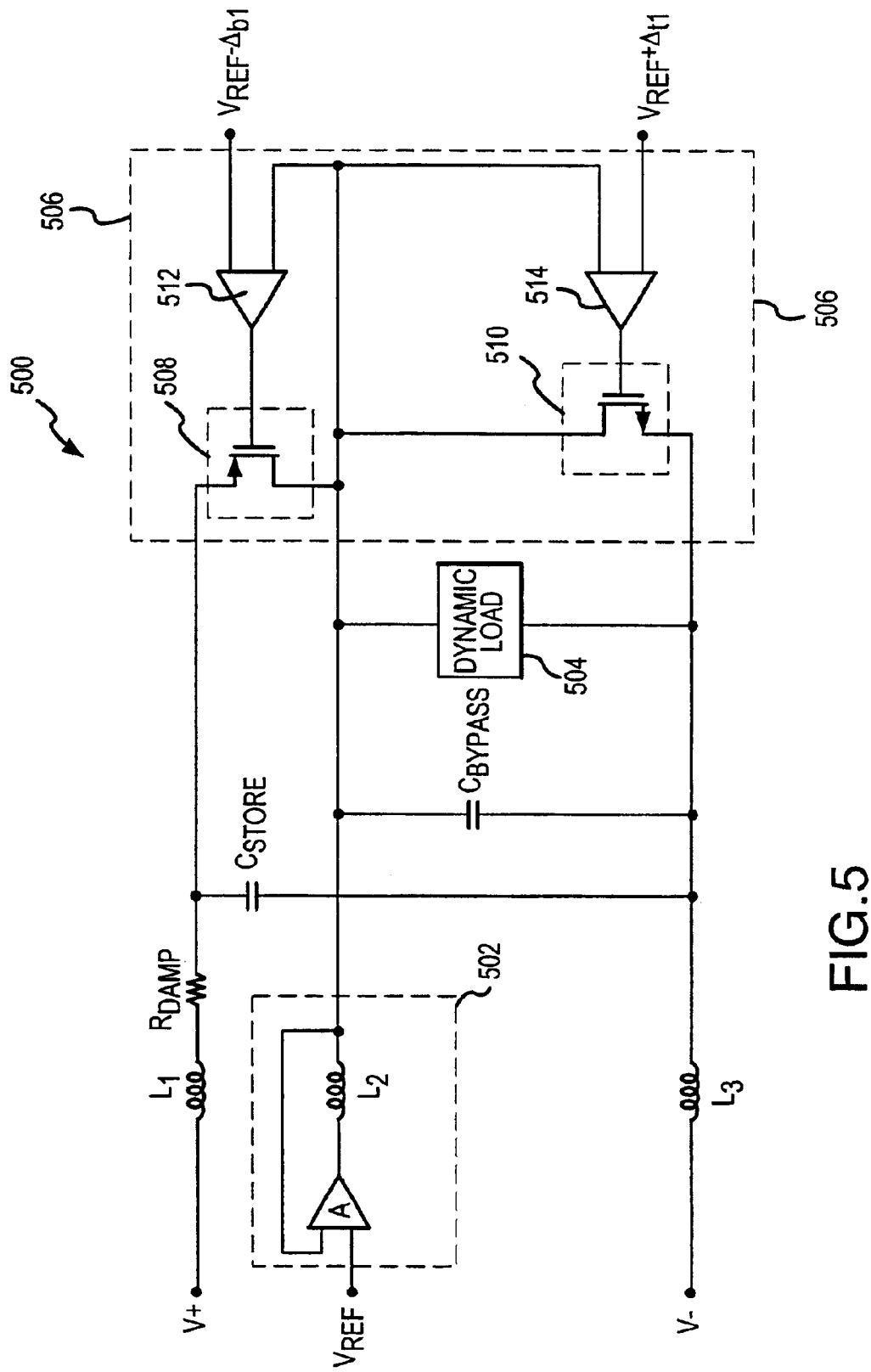
FIG. 5 illustrates a block diagram of an exemplary dual loop regulator circuit in accordance with another exemplary embodiment of the present invention.

Current sources 308 and 310 can comprise various current source devices and circuits for providing the sourcing and sinking of current. For example, with reference to a secondary voltage regulator 506 illustrated in FIG. 5, a current source 508 can comprise a P-channel, field effect transistor (PFET) and a current source 510 can comprise an N-channel device, e.g., an NFET device. PFET device 508 comprises a source coupled to a supply voltage $V^+$, a drain terminal coupled to an output of a comparator 512, and a drain coupled to a dynamic load 504, e.g., to the output of a primary regulator 502. Meanwhile, NFET device 510 comprises a source coupled to a lower supply voltage $V^-$, e.g., to ground, a drain terminal coupled to an output of a comparator 514, and a drain coupled to the drain of PFET device 508, i.e., to the output of a primary regulator 502.

While current sources 508 and 510 can comprise FET based devices, current sources 508 and 510 can also comprise bipolar devices, such as NPN transistor devices. Thus, comparators 512 and 514 can have output terminals coupled to control terminals of any type of transistor device configured to facilitate the sourcing of current to and sinking of current from dynamic load 504. Further, current sources 508 and 510 can comprise any circuit, such as current mirror circuits, or any device, such as a resistor based device, configured for sourcing of current to and sinking of current from dynamic load 504. Still further, current sources 308 and 310 can comprise the same sized devices configured to provide the same amount of current for sourcing or sinking, or differently sized devices configured to provide different amounts of current to dynamic load 304. For example, the magnitude of the current can be varied, e.g., by varying the switch resistance, to modify the gain of secondary regulator 306 for optimizing stability within dual loop regulator 300.

Upon receiving the undervoltage condition signal from the output of comparator 312, current source 308 is configured to source current to dynamic load 304 to boost output voltage $V_{LOAD}$. Meanwhile, upon receiving the overvoltage condition signal from the output of comparator 314, current source 310 is configured to sink current from dynamic load 304 to reduce output voltage $V_{LOAD}$. However, in between the undervoltage and overvoltage conditions, current sources 308 and 310 are not configured to source or sink current to dynamic load 304, since comparators 312 and 314 will not provide any output signals to operate current sources 308 and 310.

Figure 4:
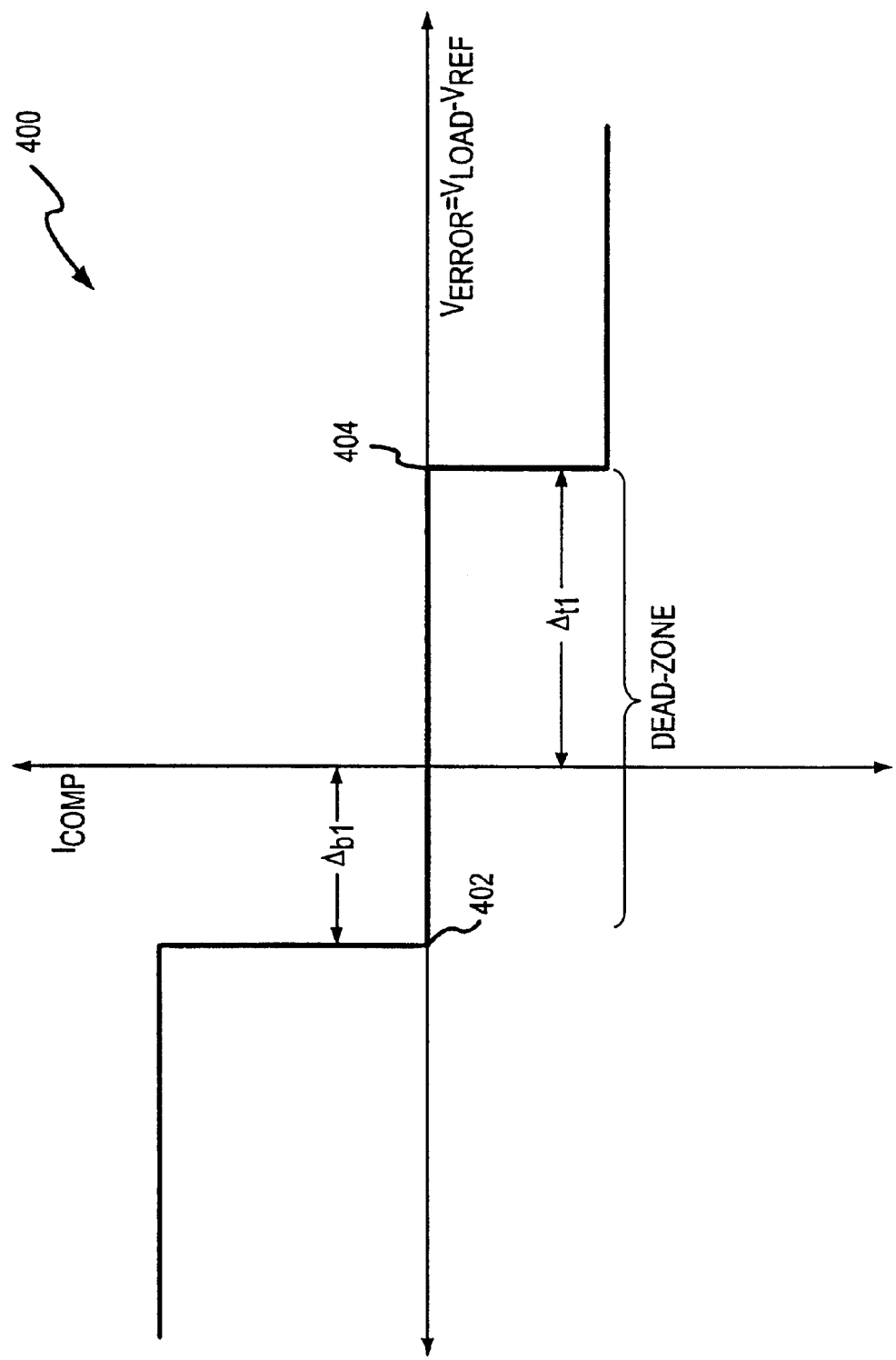
FIG. 4 illustrates a transfer function of an exemplary secondary regulator in accordance with an exemplary embodiment of the present invention.

To further illustrate operation of secondary voltage regulator 306, with reference to FIG. 4, an exemplary transfer function 400 is provided. During normal operation, i.e., when load voltage $V_{LOAD}$ at dynamic load 304 is less than the overvoltage condition and greater than the undervoltage condition, secondary voltage regulator 306 is not providing regulation of load voltage $V_{LOAD}$. Instead, primary voltage regulator 302 can suitably address the small changes in load voltage $V_{LOAD}$ within a linear loop to provide a controlled load voltage approximate to reference voltage $V_{REF}$, with or without the assistance of bypass capacitor $C_{BYPASS}$. As such, a "dead-zone" is created for operation, e.g., between limit 402 and limit 404 on transfer function 400, when the difference between load voltage $V_{LOAD}$ and reference voltage $V_{REF}$, i.e., error voltage $V_{ERROR}$, is between undervoltage limit $\Delta_{b1}$ and overvoltage limit $\Delta_{t1}$.

However, if a sudden transient event results in error voltage $V_{ERROR}$ being outside undervoltage limit $\Delta_{b1}$ or overvoltage limit $\Delta_{t1}$, secondary voltage regulator 306 will operate within the non-linear, wideband loop to appropriately source or sink current to dynamic load 304. For example, if load voltage $V_{LOAD}$ decreases to a voltage less than the difference between reference voltage $V_{REF}$ and undervoltage limit $\Delta_{b1}$, i.e., to the left of limit 402 on transfer function 400, comparator 312 will suitably provide an output signal to current source 308 to source current $I_{COMP}$ to dynamic load 304 in an attempt to increase load voltage $V_{LOAD}$ approximately back towards reference voltage $V_{REF}$. In addition, primary voltage regulator 302 will continue operating within the linear loop in an attempt to more slowly force load voltage $V_{LOAD}$ to approximately reference voltage $V_{REF}$, eventually taking full control of regulation once secondary regulator 306 has brought the difference between load voltage $V_{LOAD}$ and reference voltage $V_{REF}$ to within the dead-zone region.

On the other hand, if load voltage $V_{LOAD}$ increases to a voltage greater than the sum of reference voltage $V_{REF}$ and an overvoltage limit $\Delta_{t1}$, i.e., to the right of limit 404 on transfer function 400, comparator 314 will suitably provide an output signal to current source 310 to sink current $I_{COMP}$ from dynamic load 304 in an attempt to decrease load voltage $V_{LOAD}$ approximately back towards reference voltage $V_{REF}$. Further, primary voltage regulator 302 will continue operating within the linear loop in an attempt to more slowly force load voltage $V_{LOAD}$ to approximately reference voltage $V_{REF}$, again taking fill control of regulation once secondary regulator 306 has brought the difference between load voltage $V_{LOAD}$ and reference voltage $V_{REF}$ to within the dead-zone region.

Accordingly, stability in the wideband, nonlinear loop can be realized because the nonlinear loop is not activated for small difference voltages, i.e., when the difference between the load voltage $V_{LOAD}$ and reference voltage $V_{REF}$ is within the dead-zone region between undervoltage limit $\Delta_{b1}$ and overvoltage limit $\Delta_{t1}$. Instead, the wideband, nonlinear loop is active during transient events outside the dead-zone region in a manner to facilitate and/or maintain efficiency within the linear loop, and thus provide a combined response that is improved over the linear loop working alone. In addition, undervoltage limit $\Delta_{b1}$ and overvoltage limit $\Delta_{t1}$ can be made sufficiently large such that the delay in comparators 312 and 314 and current sources 308 and 310 is not sufficient to cause the nonlinear loop to significantly overshoot reference voltage $V_{REF}$ and inadvertently activate the other side of the loop, i.e., to switch immediately from an overvoltage condition to an undervoltage condition, or vice versa.

In addition to stability, secondary regulator 306 is configured for magnitude control. For example, for large step changes of load voltage $V_{LOAD}$, secondary voltage regulator 306 can turn on and suitably source and sink current to dynamic load 304; for medium step changes, secondary voltage regulator 306 can turn on and off on a more frequent basis to suitably regulate load voltage $V_{LOAD}$; and for smaller step changes just outside of undervoltage limit $\Delta_{b1}$ and overvoltage limit $\Delta_{t1}$, secondary voltage regulator 306 may turn on briefly and then turn off for a longer period, such as when another step change outside of undervoltage limit $\Delta_{b1}$ and overvoltage limit $\Delta_{t1}$ occurs. Further, while the gain outside of the dead zone can be very large to address extremely large and fast changes in dynamic load current, the effective gain around reference voltage $V_{REF}$ can be kept small.

Dual loop regulator circuit 300 can also be further configured to provide for additional stability of secondary voltage regulator 306 during operation without oscillation, i.e., without triggering one of current sources 308 or 310 to source or sink current so strongly such that another current source is triggered, resulting in secondary voltage regulator 306 bouncing back and forth between overvoltage and undervoltage conditions. One manner for reducing or eliminating oscillations is to increase the dead-zone region, i.e., the amount of voltage between undervoltage limit $\Delta_{b1}$ and overvoltage limit $\Delta_{t1}$. However, while increasing stability, increasing the dead-zone region can increase the amount that output voltage $V_{LOAD}$ can vary. As discussed above, providing asymmetrical threshold levels to undervoltage limit $\Delta_{b1}$ and overvoltage limit $\Delta_{t1}$ can minimize undesirable oscillations.

Another manner for reducing or eliminating oscillations is to control the magnitude of current that current sources 308 and 310 source or sink to dynamic load 304. However, simply reducing the amount of current that current sources 308 and 310 source to or sink from dynamic load 304, while reducing oscillations, does not optimize the operation of the wideband, non-linear loop, i.e., it is more desirable to suitably maximize the amount of current that current sources 308 and 310 can source to and sink from dynamic load 304 without reaching instability for a particular dead-zone region.

In accordance with another exemplary embodiment, dual loop regulator circuit 300 can also be configured with a dampening circuit configured to continuously minimize the impact of secondary voltage regulator 306 during operation. For example, with reference again to FIG. 5, dual loop regulator 500 can comprise a resistor $R_{DAMP}$ and a capacitor $C_{STORE}$ configured for reducing the current supplied to dynamic load 504. Resistor $R_{DAMP}$ is coupled between supply voltage $V^+$ and current source 508, while capacitor $C_{STORE}$ is coupled between current source 508 and lower supply voltage $V^-$. As current is supplied from current source 508, some of the current is absorbed by capacitor $C_{STORE}$, and replenished through resistor $R_{DAMP}$.

Thus, for example, when an undervoltage condition exists, current source 508 can suitably source a strong current to dynamic load 504 until load voltage $V_{LOAD}$ overcompensates, thus enabling current source 510 to suitably sink current strongly until an undervoltage condition is again reached. However, as current source 508 suitably sources current, the amount of current supplied to dynamic load 504 is reduced by the effects of resistor $R_{DAMP}$ and a capacitor $C_{STORE}$ which operate to reduce the amount of charge available. In other words, stability can be realized since dual loop regulator circuit 500 has a limited amount of charge and energy for supplying current.

While each of the above manners for increasing stability can be included within various embodiments of the present invention, it is also desirable to combine two or more of the above features. Preferably, each of the features, including an optimized and/or asymmetrical dead-zone region, an optimized magnitude of current that current sources 308 and 310 source to and sink from dynamic load, and the addition of resistor $R_{DAMP}$ and a capacitor $C_{STORE}$ can be suitably implemented at the same time to facilitate increased stability.

Figure 2:
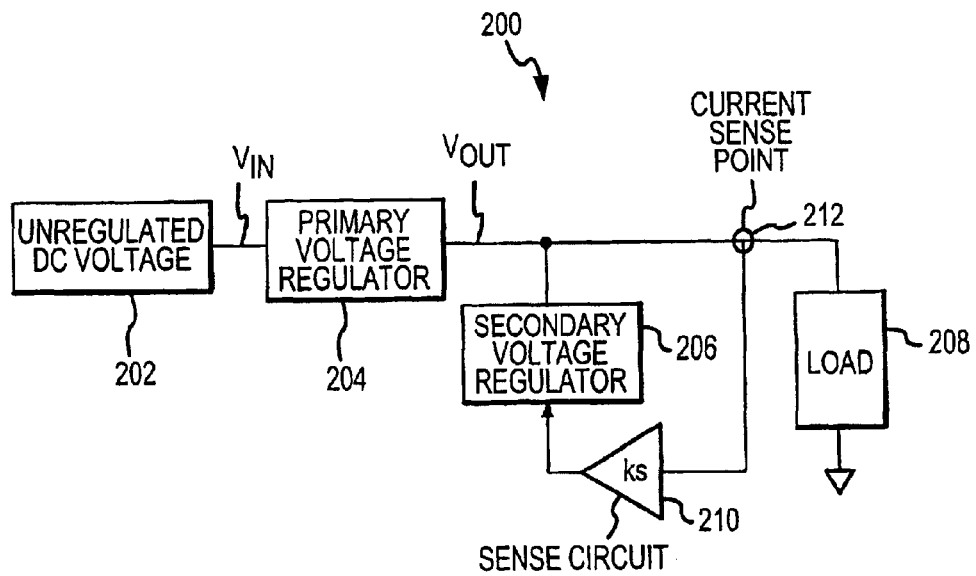
FIG. 2 illustrates a block diagram of an exemplary voltage regulator circuit.

A dual loop regulator circuit can also be suitably configured in various other manners for providing improved regulation of a load voltage for a dynamic load based on the magnitude of changes in the load voltage, including the configuration of the primary voltage regulator configured within the linear loop and the secondary voltage regulator configured within the wideband, non-linear loop. For example, in addition to the magnitude control provided by secondary voltage regulator 306, a dual loop regulator circuit can also include various features of the voltage regulator circuit of FIG. 2, such as current sense circuit 210, such as a current sense circuit disclosed in U.S. application Ser. No. 09/945,187, entitled, "Apparatus and System for Providing Transient Suppression Power Regulation", filed on Aug. 31, 2001, and having common inventors and a common assignee as the present application, hereby incorporated by reference herein. Further, one or more current sense circuits can be coupled between bypass capacitor $C_{BYPASS}$ and the dynamic load, e.g., to measure the current through parasitic inductance $L_2$ and/or parasitic inductance $L_4$. The output of the current sense circuit(s) can be suitably coupled with secondary voltage regulator 306, or another secondary voltage regulator as disclosed within U.S. application Ser. No. 09/945,187.

Figure 6:
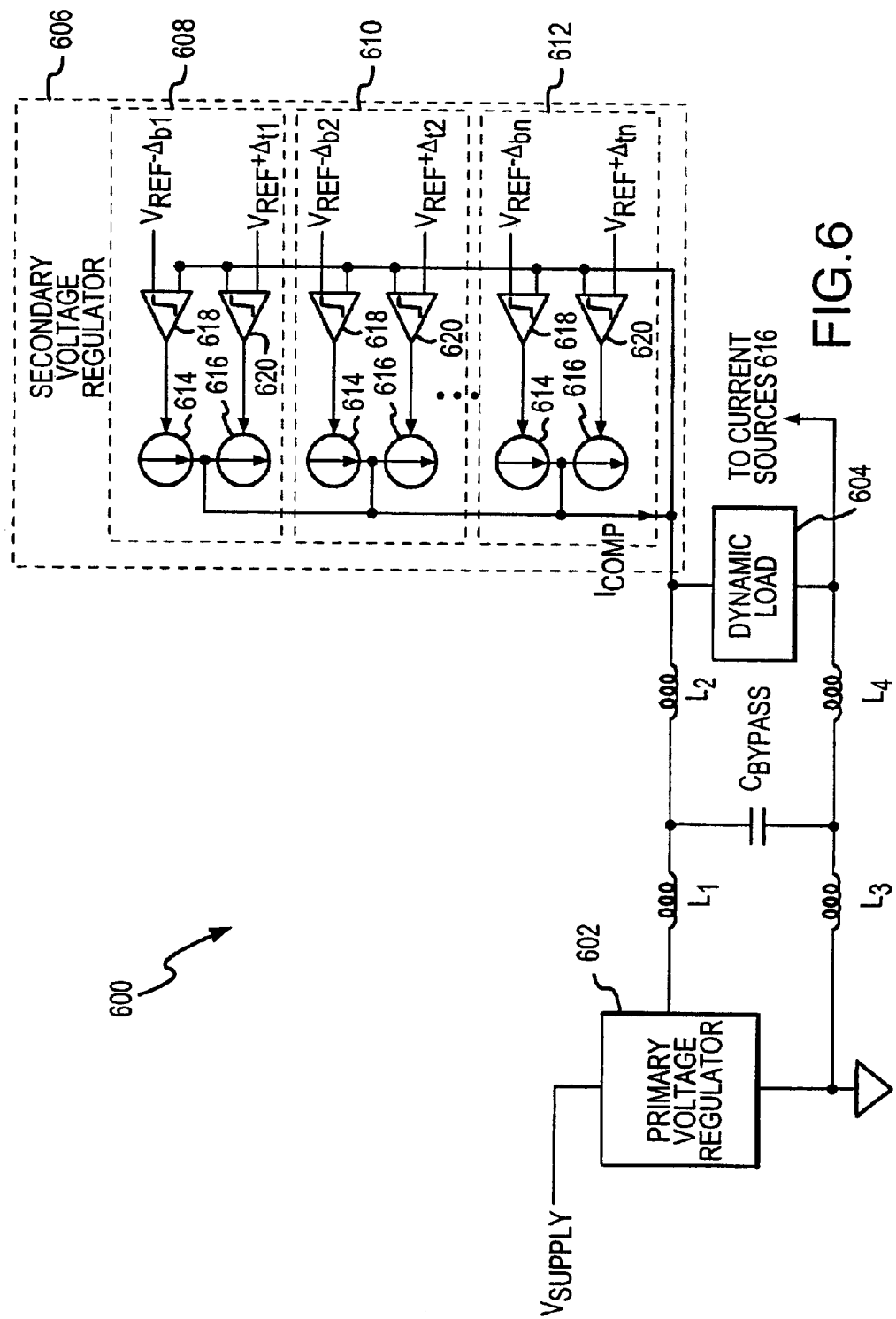
FIG. 6 illustrates a block diagram of an exemplary dual loop regulator circuit in accordance with another exemplary embodiment of the present invention.

Further, a dual loop regulator circuit can comprise a secondary voltage regulator configured with a plurality of pairs of comparators and current sources configured for sourcing and/or sinking current to a dynamic load. For example, with reference to FIG. 6, a dual loop regulator 600 is comprises a primary voltage regulator 602, a dynamic load 604, and a secondary voltage regulator circuit 606. Primary voltage regulator 602 and dynamic load 604 can be configured similarly to that of primary voltage regulator 302 and dynamic load 304. In addition, although not explicitly illustrated in FIG. 6, dual loop regulator 600 can also include the addition of a resistor $R_{DAMP}$ and a capacitor $C_{STORE}$ to facilitate increased stability, such as that illustrated in FIG. 5 within dual loop regulator 500.

Secondary voltage regulator circuit 606 comprises a plurality N of secondary voltage regulators, e.g., secondary voltage regulators 608, 610 and 612. While three secondary voltage regulators are illustrated, secondary voltage regulator circuit 606 can have two secondary voltage regulators, or four or more secondary voltage regulators, depending on a desired transfer function for secondary voltage regulator circuit 606. The plurality of N of secondary voltage regulators can also be configured on the same integrated circuit or chip device, or resident within an array of two or more chip devices.

In the illustrative embodiment, each of secondary voltage regulators 608, 610 and 612 suitably comprise a pair of comparators 618 and 620 configured with a pair of current sources 614 and 616 to facilitate sourcing of current to and sinking of current from dynamic load 604. In addition, each of secondary voltage regulators 608, 610 and 612 are suitably configured with separate undervoltage limits and overvoltage limits, e.g., secondary voltage regulator 608 is configured with undervoltage limit $\Delta_{b1}$ and overvoltage limit $\Delta_{t1}$, secondary voltage regulator 610 is configured with undervoltage limit $\Delta_{b2}$ and overvoltage limit $\Delta_{f2}$, and secondary voltage regulator 612 is configured with undervoltage limit $\Delta_{b3}$ and overvoltage limit $\Delta_{f3}$. Accordingly, the undervoltage and overvoltage limits of secondary voltage regulators 608, 610 and 612 do not overlap.

Current sources 614 and 616 for each of secondary voltage regulators 608, 610 and 612 can be configured to source and sink similar amounts of current to dynamic load 604. Further, current sources 614 and 616 for each of secondary voltage regulators 608, 610 and 612 can also be configured to source and sink different amounts of current corresponding to the appropriate undervoltage and overvoltage limits of secondary voltage regulators 608, 610 and 612. For example, for a larger undervoltage limit $\Delta_{bn}$, a current source 616 corresponding to secondary voltage regulator 612 can provide a larger amount of sourcing current, while for a smaller undervoltage limit $\Delta_{b1}$, a current source 616 corresponding to secondary voltage regulator 608 can provide a smaller amount of sourcing current. Such an exemplary embodiment can be effective at increasing the amount of current exponentially as the amount of error voltage $V_{ERROR}$ increases.

Accordingly, secondary voltage regulators 608, 610 and 612 can have separate transfer functions that are triggered at different times and combined to have a multiple-stepped transfer function, e.g., the output current of current sources 614 and 616 can be suitably summed for any of secondary voltage regulators 608, 610 and 612 once the undervoltage and overvoltage limits for any of secondary voltage regulators 608, 610 and 612 are reached.

Figure 7:
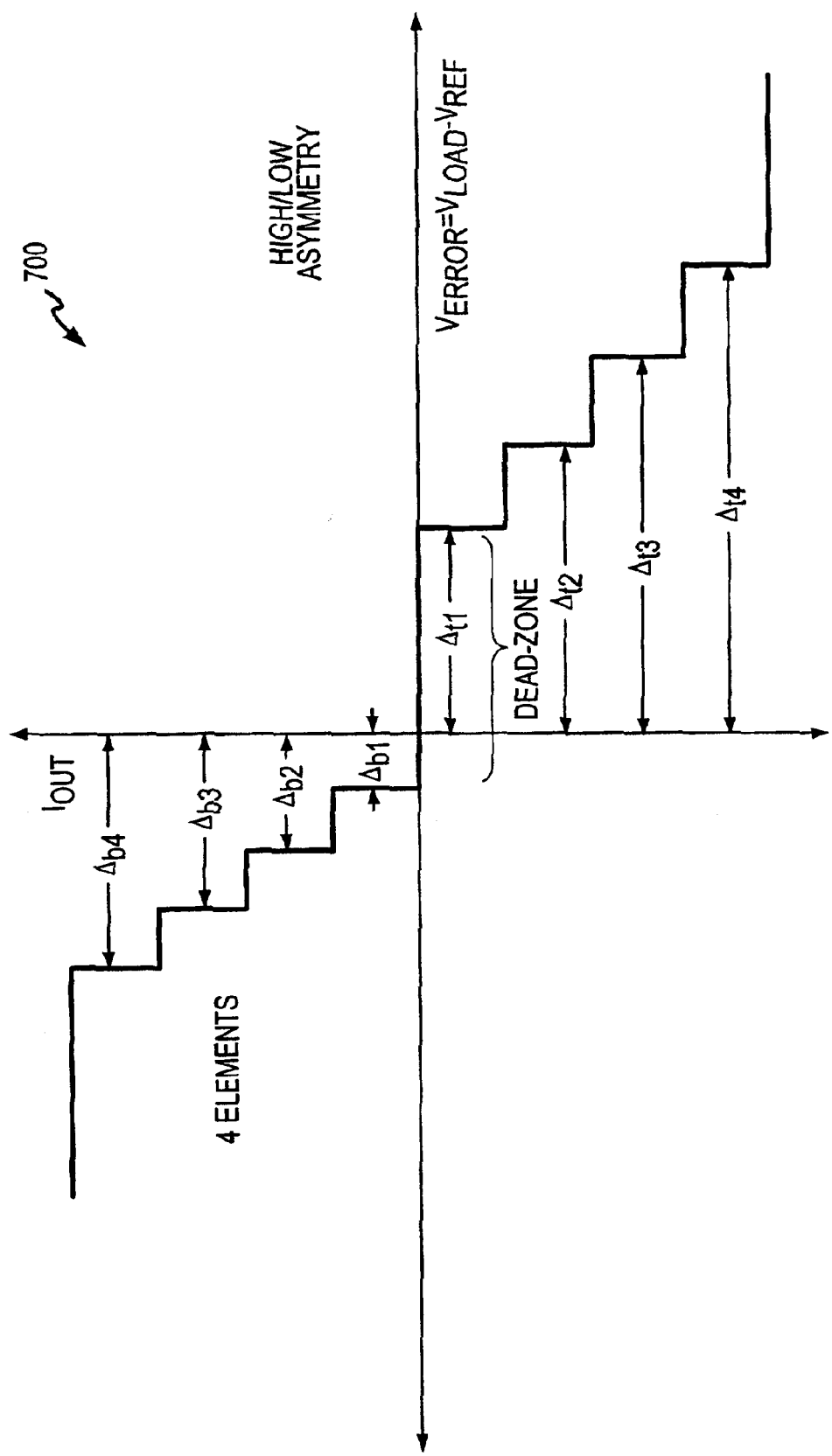
FIG. 7 illustrates a transfer function of an exemplary secondary regulator in accordance with another exemplary embodiment of the present invention.

For example, with reference to FIG. 7, for a secondary voltage regulator circuit comprising four secondary voltage regulators, a multiple-stepped transfer function 700 is illustrated. Transfer function 700 suitably comprises a plurality of stepped zones for regulation of a dynamic load. The stepped zones can be incremented equally, in gradually increasing or decreasing steps, or in any other suitable arrangement. In addition, the undervoltage and overvoltage limits for the stepped zones can be symmetrical or asymmetrical. Further, secondary voltage regulators 608, 610 and 612 can also be configured with various logic devices such that only one of secondary voltage regulators 608, 610 and 612 can be turned on at the same time.

The present invention has been described above with reference to various exemplary embodiments. However, those skilled in the art will recognize that changes and modifications may be made to the exemplary embodiments without departing from the scope of the present invention. The various components may be implemented in alternate ways, such as, for example, by providing a plurality of secondary voltage regulators, with one or more of the plurality of secondary voltage regulators configured for detecting only one of the undervoltage or overvoltage conditions. These alternatives can be suitably selected depending upon the particular application or in consideration of any number of factors associated with the operation of the dual loop regulator. Moreover, these and other changes or modifications are intended to be included within the scope of the present invention, as set forth in the following claims.

What is claimed is:

1. A dual loop regulator circuit configured for providing a regulated load voltage, said dual loop regulator comprising:
    a primary voltage regulator configured within a linear loop for regulating the load voltage;
    a dynamic load configured for receiving the regulated load voltage; and
    a secondary voltage regulator configured within a non-linear loop for regulating the load voltage, said secondary voltage regulator comprising:
        at least one comparator configured for determining one of an undervoltage and an overvoltage condition at said dynamic load; and
        at least one current source coupled between said at least one comparator and said dynamic load, said at least one current source configured for regulating load current in said dynamic load when one of said undervoltage and said overvoltage condition at said dynamic load is present.

2. The dual loop regulator circuit according to claim 1, wherein said at least one current source comprises a transistor device having a control terminal coupled to an output terminal of said at least one comparator.

3. The dual loop regulator circuit according to claim 1, wherein said dual loop regulator circuit further comprises a bypass capacitor coupled in parallel with said dynamic load and configured for filtering dynamic currents.

4. The dual loop regulator circuit according to claim 1, wherein said undervoltage condition comprises a decrease in the load voltage by more than an undervoltage limit and said overvoltage condition comprises an increase in the load voltage by more than an overvoltage limit, said undervoltage limit and said overvoltage limit defining a dead-zone region in between, said dead-zone region configured for operation only by said primary voltage regulator.

5. The dual loop regulator circuit according to claim 4, wherein said undervoltage limit and said overvoltage limit are configured in an asymmetrical manner.

6. The dual loop regulator circuit according to claim 1, wherein said secondary voltage regulator is configured for magnitude control by turning on said at least one current source based on an amount of voltage in excess of one of said overvoltage condition and said undervoltage condition.

7. The dual loop regulator circuit according to claim 1, wherein said dual loop regulator further comprises a dampening circuit for limiting an amount of charge for supplying current to said dynamic load, said dampening circuit comprises a resistor coupled between said at least one current source and an upper supply voltage, and a store capacitor coupled between said at least one current source and a lower supply voltage.

8. A dual loop regulator for providing a regulated load voltage to a dynamic load, said dual loop regulator comprising:
    a primary voltage regulator configured for receiving an upper supply voltage and regulating the load voltage, said primary voltage regulator configured within a linear loop; and
    a secondary voltage regulator configured for regulating the load voltage through magnitude control upon detecting at least one of an undervoltage condition and an overvoltage condition, said secondary voltage regulator configured within a non-linear, wideband loop for providing a faster response than said linear loop.

9. The dual loop regulator according to claim 8, wherein said dual loop regulator further comprises a bypass capacitor coupled between an output terminal of said primary voltage regulator and a lower supply voltage, said bypass capacitor configured for filtering dynamic currents.

10. The dual loop regulator according to claim 8, wherein said primary voltage regulator comprises a switching regulator.

11. The dual loop regulator according to claim 8, wherein said secondary voltage regulator comprises:

a first comparator configured for detecting said overvoltage condition;

a first current source coupled to said first comparator and configured for sinking current from the dynamic load when said overvoltage condition exists;

a second comparator configured for detecting said undervoltage condition; and a second current source coupled to said second comparator and configured for sourcing current to the dynamic load when said undervoltage condition exists.

12. The dual loop regulator according to claim 8, wherein said dual loop regulator further comprises a circuit for limiting an amount of charge for supplying current to the dynamic load, said circuit comprises a resistor coupled between said at least one current source and an upper supply voltage, and a store capacitor coupled between said at least one current source and a lower supply voltage.

13. A method for regulating a load voltage for a dynamic load, said method comprising the steps of:

providing regulation of the load device with a primary voltage regulator when the load voltage is within an undervoltage limit and an overvoltage limit of a reference voltage;

sinking current to the dynamic load from a secondary non-linear voltage regulator when said load voltage is greater than said reference voltage by said overvoltage limit; and sourcing current from the dynamic load from said secondary voltage regulator when said load voltage is less than said reference voltage by said undervoltage limit.

14. The method according to claim 13, wherein said method further comprises the step of providing a finite amount of charge for supplying current to the dynamic load.

15. The method according to claim 13, wherein said step of sinking current comprises sinking current from a plurality of current sources when said load voltage is greater than said reference voltage by a plurality of overvoltage limits.

16. The method according to claim 13, wherein said step of sourcing current comprises sourcing current from a plurality of current sources when said load voltage is less than said reference voltage by a plurality of undervoltage limits.

17. A voltage regulator circuit for providing a regulated load voltage, said voltage regulator circuit comprising:

a primary voltage regulator for regulating the load voltage;

a load device configured for receiving the regulated load voltage; and a secondary non-linear voltage regulator configured for regulating the load voltage when said load voltage exceeds an overvoltage limit through sinking of current from said load device, and when said load voltage is less than an undervoltage limit through sourcing of current to said load device.

18. The voltage regulator circuit according to claim 17, wherein said secondary voltage regulator comprises:

a first comparator configured for detecting when said load voltage exceeds said overvoltage limit;

a first current source coupled to said first comparator and configured for sinking current from said load device once said load voltage exceeds said overvoltage limit;

a second comparator configured for detecting when said load voltage is less than said undervoltage limit; and a second current source coupled to said second comparator and configured for sourcing current to the load device when said load voltage is less than said undervoltage limit.

19. The voltage regulator according to claim 17, wherein said voltage regulator further comprises a resistor and a capacitor configured for facilitating a finite charge storage in said voltage regulator for increased stability.

20. The voltage regulator according to claim 17, wherein said primary voltage regulator is configured within a linear loop, and said secondary voltage regulator is configured within a non-linear loop.

21. A dual loop regulator circuit configured for providing a regulated load voltage, said dual loop regulator comprising:

a primary voltage regulator configured within a linear loop for regulating the load voltage;

a dynamic load configured for receiving the regulated load voltage; and a secondary voltage regulator configured within a non-linear loop for regulating the load voltage, said secondary voltage regulator comprising:

at least one comparator configured for determining one of an undervoltage and an overvoltage condition at said dynamic load; and at least one current source coupled between said at least one comparator and said dynamic load, said at least one current source configured for regulating load current in said dynamic load when one of said undervoltage and said overvoltage condition at said dynamic load is present;

wherein said secondary voltage regulator comprises a first comparator, a second comparator, a first current source and a second current source, said first comparator being configured for detecting said undervoltage condition and for providing a first output signal to said first current source to facilitate sourcing of current to said dynamic load, and said second comparator being configured for detecting said overvoltage condition and for providing a second output signal to said second current source to facilitate sinking of current from said dynamic load.

22. A dual loop regulator circuit configured for providing a regulated load voltage, said dual loop regulator comprising:

a primary voltage regulator configured within a linear loop for regulating the load voltage;

a dynamic load configured for receiving the regulated load voltage; and a secondary voltage regulator configured within a non-linear loop for regulating the load voltage, said secondary voltage regulator comprising:

at least one comparator configured for determining one of an undervoltage and an overvoltage condition at said dynamic load; and at least one current source coupled between said at least one comparator and said dynamic load, said at least one current source configured for regulating load current in said dynamic load when one of said undervoltage and said overvoltage condition at said dynamic load is present;

wherein said dual loop regulator further comprises plurality of secondary voltage regulator circuits, each of said plurality of secondary voltage regulator circuits comprising a first comparator, a second comparator, a first current source and a second current source, said first comparator being configured for detecting said undervoltage condition and for providing a first output signal to said first current source to facilitate sourcing of current to said dynamic load, and said second comparator being configured for detecting said overvoltage condition and for providing a second output signal to said second current source to facilitate sinking of current from said dynamic load.

23. The dual loop regulator circuit according to claim 22, wherein each of said plurality of secondary voltage regulator circuits comprises an undervoltage limit and an overvoltage limit different than that of any other of said plurality of secondary voltage regulator circuits.

24. The dual loop regulator circuit according to claim 23, wherein said plurality of secondary voltage regulator circuits is configured to provide a combined multi-step transfer function.

25. A dual loop regulator for providing a regulated load voltage to a dynamic load, said dual loop regulator comprising:
   a primary voltage regulator configured for receiving a upper supply voltage and regulating the load voltage, said primary voltage regulator configured within a linear loop; and
   a secondary voltage regulator configured for regulating the load voltage through magnitude control upon detecting at least one of an undervoltage condition and an overvoltage condition, said secondary voltage regulator configured within a non-linear, wideband loop for providing a faster response than said linear loop;
   wherein said dual loop regulator further comprise a plurality of secondary voltage regulator circuits, each of said plurality of secondary voltage regulator circuits comprising a first comparator, a second comparator, a first current source and a second current source, said first comparator being configured for detecting said undervoltage condition and for providing a first output signal to said first current source to facilitate sourcing current to the dynamic load, and said second comparator being configured for detecting said overvoltage condition and for providing a second output signal to said second current source to facilitate sinking of current from the dynamic load.

26. A dual loop regulator for providing a regulated load voltage to a dynamic load, said dual loop regulator comprising:
   a primary voltage regulator configured for receiving an upper supply voltage and regulating the load voltage, said primary voltage regulator configured within a linear loop; and
   a secondary voltage regulator configured for regulating the load voltage through magnitude control upon detecting at least one of an undervoltage condition and an overvoltage condition, said secondary voltage regulator configured within a non-linear, wideband loop for providing a faster response than said linear loop;
   wherein said dual loop regulator further comprises a sensing circuit for
   sensing load current flowing to the dynamic load device.

27. A dual loop regulator for providing a regulated load voltage to a dynamic load, said dual loop regulator comprising:

a primary voltage regulator configured for receiving an upper supply voltage and regulating the load voltage, said primary voltage regulator configured within a linear loop; and
   a secondary voltage regulator configured for regulating the load voltage through magnitude control upon detecting at least one of an undervoltage condition and an overvoltage condition, said secondary voltage regulator configured within a non-linear, wideband loop for providing a faster response than said linear loop;
   wherein said undervoltage condition comprises a decrease in the load voltage by more than an undervoltage limit and said overvoltage condition comprises an increase in the load voltage by more than an overvoltage limit, said undervoltage limit and said overvoltage limit defining a dead-zone region in between, said dead-zone region configured for operation only by said primary voltage regulator.

28. The dual loop regulator according to claim 27, wherein said undervoltage limit and said overvoltage limit are configured in an asymmetrical manner.

29. A method for regulating a load voltage for a dynamic load, said method comprising the steps of:
   providing regulation of the load device with a primary voltage regulator when the load voltage is within an undervoltage limit and an overvoltage limit of a reference voltage;
   sinking current to the dynamic load from a secondary voltage regulator when said load voltage is greater than said reference voltage by said overvoltage limit; and
   sourcing current from the dynamic load from said secondary voltage regulator when said load voltage is less than said reference voltage by said undervoltage limit;
   wherein said method further comprises the step of dampening an amount of current provided to the load device during one said sourcing and sinking steps through limiting charge storage to facilitate increased stability.

30. A method for regulating a load voltage for a dynamic load, said method comprising the steps of:
   providing regulation of the load device with a primary voltage regulator when the load voltage is within an undervoltage limit and an overvoltage limit of a reference voltage;
   sinking current to the dynamic load from a secondary voltage regulator when said load voltage is greater than said reference voltage by said overvoltage limit; and
   sourcing current from the dynamic load from said secondary voltage regulator when said load voltage is less than said reference voltage by said undervoltage limit;
   wherein said step of providing regulation of the load device with said primary voltage regulator comprises regulating within a linear loop, and said steps of sinking and sourcing current comprise regulating within a non-linear, wideband loop.

* * * * *